United States Patent Office

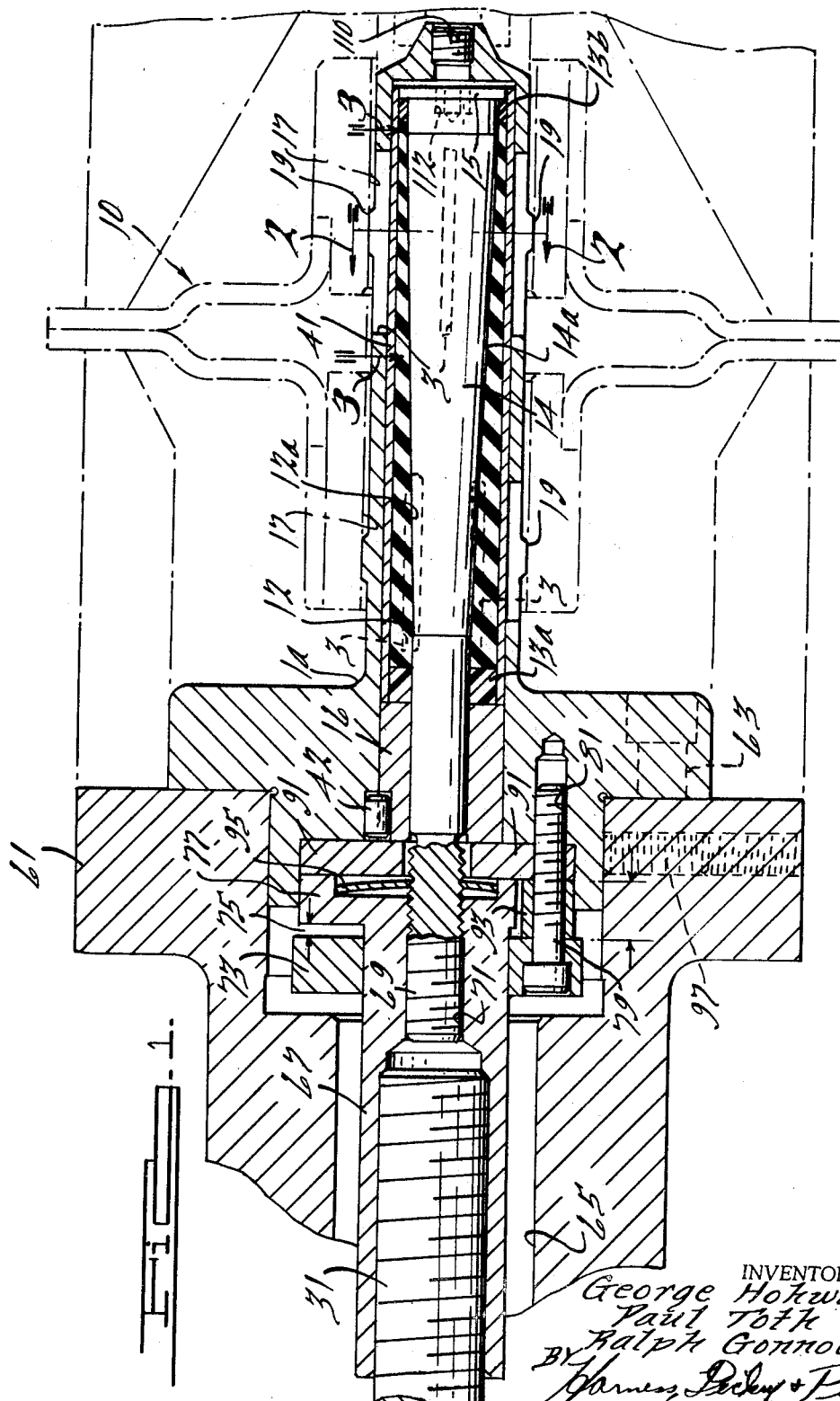

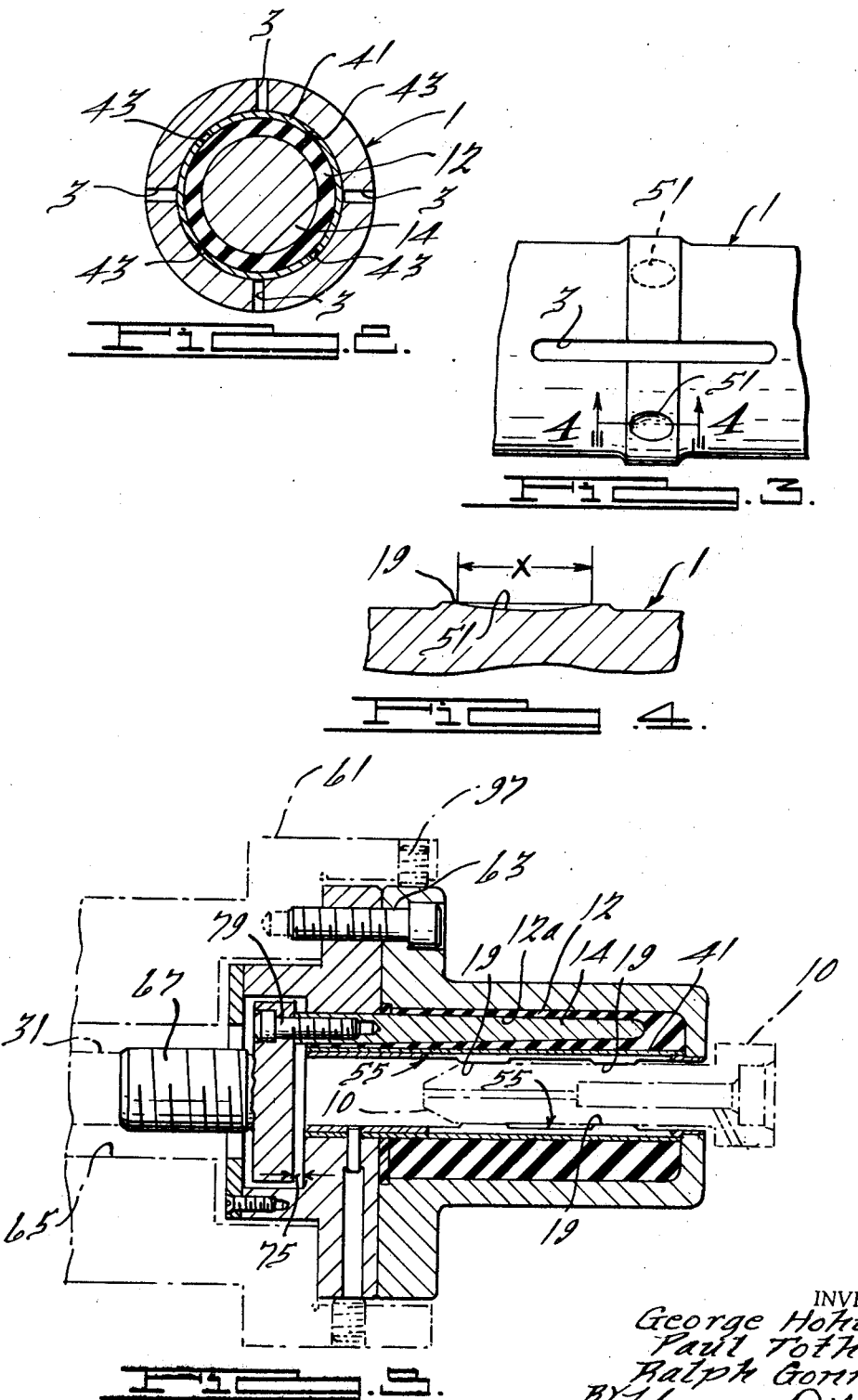

3,497,226
Patented Feb. 24, 1970

1

3,497,226
WORK MOUNTING CHUCK
George Hohwart, Farmington, Paul Toth, Allen Park, and Ralph Gonnocci, Warren, Mich., assignors to N. A. Woodworth Company, Ferndale, Mich., a corporation of Michigan
Filed Nov. 22, 1967, Ser. No. 684,994
Int. Cl. B23b 31/40
U.S. Cl. 279—2                18 Claims

ABSTRACT OF THE DISCLOSURE

An apparatus for holding workpieces comprising an arbor or chuck body which is expanded or contracted by an axially movable tapered shaft. Movement of the tapered shaft to effect gripping of the workpiece forces an elastic material against the chuck body to bring the chuck body into work holding contact.

BACKGROUND OF THE INVENTION

This invention broadly relates to new and useful improvements in work holding chucks which are operated by a tapered expander shaft causing the chuck to expand or contract to hold the workpiece in position.

Prior art U.S. patents only generally related to the invention are: Mackinder et al. 3,073,610; Cameron 3,202,-432; Conradson 2,318,838; Christman 1,818,042; Atherholt, Sr. et al. 2,797,602; Atherholt Sr. 2,971,765; Sloan 2,759,733; Ernest 2,896,954; and Gideon 2,410,493.

It is both conventional and known in the art that there are many hydraulic arbor type chucks on the market today. These are indicated, for example, in the patents referred to above. The main shortcomings of the strictly hydraulic arbor work mounting chucks are that they enable only a very limited expansion primarily for the reasons that the metal of the arbor mounting sleeve is actually stretched and this means that such an arbor can only be used when the part tolerance is held very close. Furthermore, conventional hydraulic arbors must be equipped with a safety stop so that they cannot be over expanded when no workpiece is on the arbor. Such over expansion would result in either stretching the arbor sleeve beyond its elastic limit causing it to remain oversize, or it would burst the arbor shell. Still further, there has been a continual leakage problem with strictly hydraulic arbors.

There have also been utilized in the past what may be termed rubber arbors. These rubber arbors were operated generally by causing the rubber within the arbor shell to expand thereby expanding the arbor to thereby bring it to gripping contact with the workpiece. It was found, however, that the rubber or elastic material used changed in volume due to changes in heat and humidity. The effect of this was to make it very difficult if not impossible to determine a suitable safety stop which was necessary to prevent over expansion of the rubber arbor. The most basic difficulty however was the fact that the elastic material would eventually pack almost solid and lose its plasticity, which therefore caused the arbor not to retract in size to permit loading of the next workpiece. This basic difficulty would of course become magnified when a low limit workpiece was to be loaded after a high limit workpiece had been removed.

Accordingly, it is the object of this invention to provide an improved work mounting chuck wherein expansion or contraction of the chuck is effected by an axially movable tapered expander shaft which regulates expansion or contraction of an elastic material to thereby effect gripping action of the chuck.

2

Another object of the invention is to provide a work mounting chuck operated by a tapered expander shaft wherein the chuck may be easily adjusted to accommodate a wider size range of workpieces than was heretofore possible.

Another object of the invention is to provide an arbor-type chuck wherein the outer surface of the arbor has means thereon enabling the visual detection of wear on the arbor, thus indicating that reconditioning of the arbor is necessary.

Still further it is the broad object of this invention to provide an improved work mounting chuck; and other objects, features and advantages of the invention will become apparent from the subsequent description and the appended claims taken in conjunction with the accompanying drawings.

BRIEF DESCRIPTION OF THE DRAWINGS

It should be noted that the drawings and subsequent descriptions thereof are illustrative only and should not be taken in any way as a limitation on the claims. Like numerals in different figures indicate like elements.

FIGURE 1 illustrates by cross sectional view and part phantom, a work mounting chuck or arbor in accordance with this invention;

FIGURE 2 is a cross sectional view along the line 2—2 of FIG. 1;

FIGURE 3 is a view taken along the line 3—3 of FIG. 1;

FIGURE 4 is a cross sectional view taken along the line 4—4 of FIG. 3; and

FIGURE 5 illustrates by cross-sectional view and part phantom an alternative embodiment of a work mounting chuck in accordance with the invention.

SUMMARY OF THE INVENTION

Briefly stated, the invention is an apparatus for holding workpieces comprising a chuck body, elastic material generally adjacent said body, tapered shaft means for expanding the elastic material to thereby move the chuck body into holding contact with the work, a mounting member with the chuck body attached relative thereto in stationary position, said tapered means being axially movable relative to the member in order to effect said holding contact, and a bore within the elastic material generally encasing the tapered means.

DESCRIPTION OF PREFERRED EMBODIMENTS

With reference to the preferred embodiment of the invention shown in FIGURE 1, operation of the work mounting chuck is as follows. The arbor or chuck body generally designated 1 is tubular in form and is adapted to chuck internally a workpiece designated 10. The chuck body 1 normally is undersize slightly with respect to the workpiece 10 and it is expanded radially to chuck the workpiece due to the action of an elastic material or sleeve 12, such as for example, rubber, neoprene, polyurethane, or the like. To carry out expansion of the elastic material 12, an expander or tapered shaft 14 extends axially through the elastic material 12 and is adapted for attachment to a drawbar or actuating bar 31, of the push or pull type, with which machines of the type to which the chuck is adapted to be attached normally are equipped. It is to be noted that the expanded 14 is tapered toward the inner end 1a of the chuck body as shown in FIGURE 1, and the tapering extends essentially the entire length of the sleeve or elastic material 12. The tapered expander 14 is generally encased within a bore 12a within the elastic material and the elastic material 12 is confined at its ends between spacers 13a and 13b, made of any suitable material, for example, Teflon. An end washer or head 15 on the outer end of the expander 14 overlays and seats rearwardly on the outer spacer 13b, and the inner spacer 13a seats on a plug 16 in the inner end 1a of the chuck body.

For operation of the FIGURE 1 chuck body, the tapered expander 14 is pulled inwardly, that is, to the left as viewed in the drawing and as it retracts it compresses the elastic material or sleeve 12 endwise between the spacers 13a and 13b. As this occurs, the tapered peripheral surface 14a pushes the elastic material 12 radially outwardly and the elastic material in turn acts in a manner similar to a hydraulic liquid and presses radially outwardly against the chuck body 1, causing it to expand and clampingly engage the workpiece 10 at the inner peripheral surface 17 thereof which makes contact with the raised lands 19 of the chuck body.

In order to increase the expansion range of the chuck body 1, it may be formed with longitudinal slots 3 as best shown by FIGURE 2. Normally, the elastic material 12 would tend to extrude through the slots 3 in the body 1, and to prevent this a thin sleeve 41 is inserted between the chuck body 1 and the elastic material 12. The thin sleeve 41 may be made of any suitable material, metal or otherwise, and sleeve 41 also contains slots 43 which are staggered with respect to the slots 3 in the arbor body 1. The metal sleeve 41 is held fixed in relation to the arbor body 1 by means of a dowel pin 42. Staggering of the slots 43 thereby prevents extrusion of the elastic material through the slots 3, while at the same time facilitating expansion of the sleeve 41 when the chuck body is expanded to engage the workpiece.

FIGURE 3 is a view looking down on one of the raised lands 19 of FIG. 1. A means for detecting surface on the chuck body 1 is provided by the scalloped portions designated 51. In order to visually show when the arbor or chuck body needs reconditioning the scalloped portions 51 are ground into the surface of the raised lands 19 of the chuck body, for example, the scalloped portions may be ground to form opposite wear spots on the O.D. of the arbor with a larger diameter grinding wheel. The maximum length dimension of the scalloped portion as shown in FIGURE 4 is X prior to any usage of the chuck. The user of the arbor can determine when the chuck body should be reconditioned when the length of the dimension X has been reduced to a predetermined magnitude due to usage and wear on the chuck body. By detecting the wear on the chuck body in this fashion, the user can readily determine when reconditioning of the arbor is necessary and reconditioning can be carried out, for example, by a method of chrome plating the outside diameter of the chuck body and the regrinding to its original size.

FIGURE 5 shows an alternative embodiment of the work mounting chuck of this invention wherein the workpiece 10 is chucked externally by clamping engagement with the raised lands 19. The chuck of FIGURE 5 is operated by pushing the actuating bar 31 to the right as shown in the drawing which thereby moves the tapered expander 14 into the bore 12a of the elastic material 12 which generally encases the expander 14. Movement of the expander 14 to the right as shown in FIG. 5 causes the elastic material to expand and this in turn forces the metal sleeve 41 to force inwardly against the chuck body 55 thereby bringing the chuck body into clamping engagement with the exterior of the workpiece 10.

Referring now to a more detailed description of the work mounting chuck of FIGURE 1, it can be seen that the chuck body 1 is mounted on a rotating spindle 61, or any other suitable mounting base member, by one or more threaded connectors 63. There is a central aperture 65 through the spindle 61 which enables location of the actuating bar or drawbar 31 through the spindle for connection with the connector member 67 which in turn is connected to the tapered expander shaft 14 by means of the threaded extension portion 69 forming part of the expander 14 and which is attached to the conductor member 67 at the threaded aperture 71.

The upper retaining plate 73 acts to limit the amount of travel which is possible for the expander 14 when the drawbar 31 is pulled to the left. The amount of possible travel is indicated by space 75 between the retaining plate 73 and the flange portion 77 of the connector member 67. The retaining plate 73 is prevented from further travel to the left as shown in the drawning due to its connection to the arbor body 1 by three bolts 79 (only one shown) which are fixedly attached to the arbor body at the threaded aperture designated 81. The retaining plate 73 is held spaced from a second lower retaining plate 91 by three spacer elements 93, only one of which is shown; and the spacer elements may be of any suitable material such as steel or the like.

There is interposed between the threaded portion 69 of tapered expander 14 and the lower retaining plate 91 a tension spring 95 (which may suitably be a Belleville type spring) which is threaded in its I.D. The tension spring 95 functions to prevent relative rotational movement between the chuck body 1 and the tapered expander 14 and connector member 67 during normal use of the chuck by maintaining the interfitting exteral and internal threads of the shaft 14 and the connector 67 under tension.

In order to remove the chuck body 1 from the rotating spindle or mounting member 61, it is necessary to first disconnect the one or more threaded connectors 63 which hold the chuck body to the rotating spindle. Once this is done and the one or more set screws indicated at 97 are loosened, then the chuck body can be disconnected from engagement with the drawbar 31 by rotating the chuck body and this in turn disconnects the member 67 from its connection with the drawbar 31 thereby enabling the chuck body and connector member 67 intact to be pulled away from the rotating spindle 61.

The chuck body 1 is provided with adjustability whereby the relative size of the chuck body may be varied. For example, when due to wear of the arbor body or displacement of the elastic material 12, or due to variation in dimensions of the workpiece being mounted, it is desired to adjust the original size of the chuck body, the procedure is as follows. A dust seal screw 110 is removed from the outer end of the chuck body 1 and a standard Allen wrench is inserted into a hex socket 112 in the outer end of the expander shaft 14 against the frictional resistance at the threaded connection between the expander and the connector 67 normally maintained by the spring 95. By rotating the expander 14 with an Allen wrench inserted in the socket 112 the chuck body can be varied in size over a relative size range not heretofore possible.

While the advantages of the invention should be fairly apparent from the description already set forth above, the advantages more specifically are as follows. First, it is to be noted that the shaft or expander 14 is tapered for nearly the full length that passes through the elastic material 12. When this expander is moved through the elastic material it expands the material approximately equally for its full length instead of acting as a hydraulic piston only, which would expand the elastic material initially in an unequal fashion in the area proximate to a piston if it were used. Similarly when the expander is moved in a direction to release the chuck, the tapered shaft permits and in fact causes the elastic material and arbor to collapse all along its effective length. It has been discovered that the clamping and unclamping action of the work mounting chuck works extremely well as a result of this tapered feature.

Second, the work mounting chuck of this invention, as illustrated in FIGURE 1, includes means for detecting wear on the surface of the chuck body and this is most clearly illustrated by FIGURES 3 and 4. The scalloped portion 51 is of a certain predetermined length X when the chuck body is originally put into use. As the chuck body is worn down by the mounting and demounting of numerous workpieces the length of the scalloped portion decreases and this enables the user of the chuck body to determine when the surface of the chuck should be reconditioned.

Third, the chuck body is provided with an adjustability feature. When due to wear on the arbor body 1, or displacement of the elastic material 12, or for other reasons, there is a resulting change in the original size of the chuck body, then the dust seal screw 110, as shown in FIGURE 1, may be removed. The size of the chuck body can then be adjusted by use of a standard Allen wrench inserted into the hex socket 112 at the end of the chuck body, and the expander can be rotated with the wrench to thereby adjust the size of the arbor body.

Fourth, the expanding mechanism used for the chuck body 1 in FIGURE 1, includes the inner sleeve 41 which may suitably be slotted as indicated by the slots 43, and the chuck body 1 itself may also suitably contain slots indicated at 3, to facilitate expansion of the chuck body. The slots on the inner sleeve 41 and the slots in the chuck body are staggered with respect to each other to prevent any of the elastic material from extruding through the slots. While the staggered slotting arrangement is preferred to facilitate expansion of the chuck body, the chuck may also be constructed without slots in which event the inner thin sleeve 41 would not necessarily have to be present; and, to utilize a design which does not contain slots the chuck body would be constructed simply from a solid thin sleeved body.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An apparatus for holding work comprising
a chuck body,
elastic material generally adjacent said body,
tapered shaft means for expanding the elastic material to thereby move the chuck body into holding contact with the work,
a mounting member with the chuck body attached relative thereto in stationary position,
said tapered shaft means being axially movable relative to the member in order to effect said holding contact, and
a bore within the elastic material generally encasing the tapered means.

2. The apparatus of claim 1 wherein
said chuck body is hollow and of generally cylindrical shaped wall structure, and contains
longitudinal slots positioned about the wall,
a sleeve in generally mating contact with the chuck body wall,
said sleeve containing a group of second slots in staggered relation to the longitudinal slots, to thereby prevent the elastic material from being extruded through the chuck body wall, with the slots acting to facilitate movement of the chuck body into holding contact.

3. An apparatus for holding work comprising
a chuck body of generally cylindrical hollow shape,
elastic material generally adjacent said body and positioned inside thereof,
tapered shaft means for expanding the elastic material to thereby move the chuck body into holding contact with the work,
a mounting member with the chuck body attached relative thereto in stationary position,
said tapered means being axially movable relative to the member in order to effect said holding contact by expanding the elastic material and chuck body, and
a bore within the elastic material generally encasing the tapered means.

4. The apparatus of claim 3 wherein
said chuck body contains a cylindrical shaped wall with longitudinal slots positioned about the wall,
a sleeve in generally mating contact with the chuck body wall,
said sleeve containing a group of second slots in staggered relation to the longitudinal slots, to thereby preventing the elastic material from being extruded through the chuck body wall, with the slots acting to facilitate movement of the chuck body into holding contact.

5. The apparatus of claim 3 wherein said chuck body includes
raised lands to facilitate the holding contact with the work, and at least one of the raised lands includes thereon,
means for detecting surface wear of the chuck body.

6. The apparatus of claim 3 wherein there is included at the tip end of the chuck body adjustment means for varying transverse dimensions of the chuck body to thereby enable mounting of a relatively large size range of workpieces on the apparatus.

7. The apparatus of claim 5 wherein there is included at the tip of the chuck body adjustment means for varying transverse dimensions of the chuck body to thereby enable mounting of a relatively large size range of workpieces on the apparatus.

8. The apparatus of claim 1 wherein
said chuck body has an elongate work holding portion,
said tapered shaft means extends substantially at least the full length of said work holding portion, and
said bore is correspondingly tapered and of a length approximately equal to and adapted to receive said tapered shaft means,
whereby axial movement of said shaft means in one direction exerts a radial clamping pressure on said chuck body through said elastic material over the length of said taper and said work holding portion, and axial movement of said shaft means in the opposite direction relieves said clamping pressure substantially uniformly and simultaneously over the entire length of said taper and said work holding portion.

9. The apparatus as set forth in claim 8 wherein
said chuck body and said elastic material are both tubular in form with said elastic material inside said chuck body and,
said tapered shaft means is disposed in and is movable relative to said elastic material.

10. The apparatus of claim 3 including an actuator for said tapered shaft means, and an adjustable connection between said actuator and said tapered shaft means operable to shift said tapered shaft means axially and its normal position in the bore of said elastic material and consequently the amount of said holding contact achieved by a given axial movement of said shaft means.

11. The apparatus of claim 10 including means operable from the end of said shaft for actuating said adjustable connection.

12. The apparatus of claim 6 wherein said adjustment means includes socket means for rotating said tapered shaft to vary the dimension of the chuck body in accordance with the dimension of a workpiece.

13. The apparatus of claim 1 wherein said mounting member includes tension means for normally preventing relative rotational movement between said chuck body and tapered shaft.

14. The apparatus of claim 12 wherein said mounting member includes tension means for normally preventing relative rotational movement between said chuck body and tapered shaft.

15. The apparatus of claim 14 wherein mounting of said chuck body is carried out by threaded connector means operable to hold the chuck body in engagement with an actuator bar.

16. The apparatus of claim 15 further characterized in that said chuck body includes raised lands to facilitate the holding contact with the work, and at least one of the raised lands includes thereon, means for detecting surface wear of the chuck body.

17. The apparatus of claim 15 wherein said means for detecting surface wear includes at least one dished-out portion formed on the raised land of the chuck body, which dished-out portion indicates surface wear by a reduction in its length.

18. The apparatus of claim 1 wherein said chuck body includes raised lands to facilitate holding contact with the work and at least one of the raised lands includes thereon, means for detecting surface wear of the chuck body, said means for detecting surface wear including at least one cut-out portion formed on raised lands of the chuck body, which cut-out portion upon becoming reduced in length indicates thereby the surface wear.

References Cited

UNITED STATES PATENTS

| | | | |
|---|---|---|---|
| 2,410,493 | 11/1946 | Gideon | 82—44 |
| 2,518,508 | 8/1950 | Van Bever | 82—44 |
| 2,626,811 | 1/1953 | Howard et al. | 279—2 |
| 2,896,954 | 7/1959 | Ernest | 279—2 |
| 2,929,635 | 3/1960 | Czerenda | 279—2 |

ROBERT C. REARDON, Primary Examiner

D. D. EVENSON, Assistant Examiner

U.S. Cl. X.R.

279—50